UNITED STATES PATENT OFFICE.

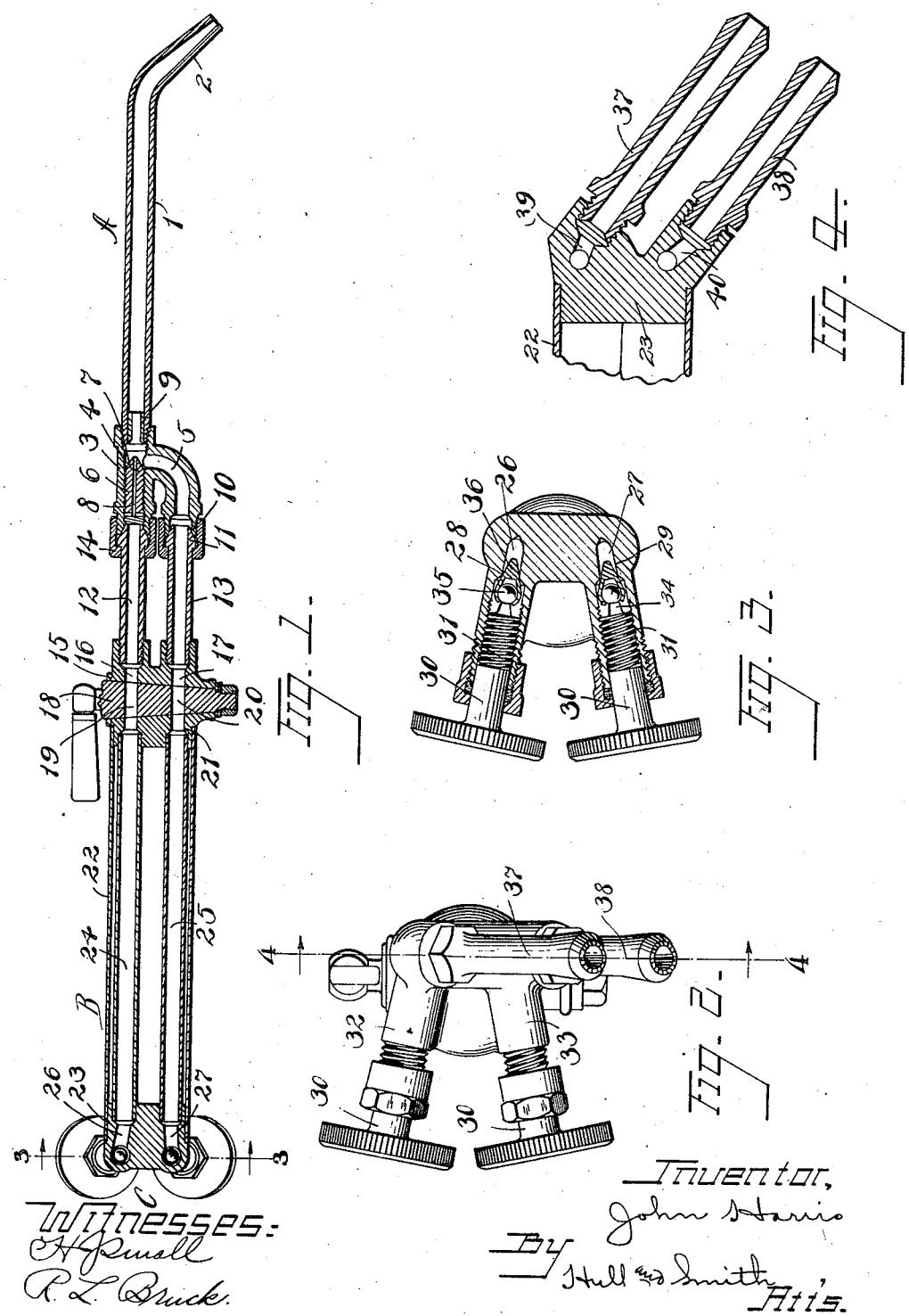

JOHN HARRIS, OF CLEVELAND, OHIO, ASSIGNOR TO CARBO-HYDROGEN COMPANY OF AMERICA, OF PITTSBURGH, PENNSYLVANIA, A CORPORATION OF DELAWARE.

WELDING-TORCH.

1,277,068.  Specification of Letters Patent.  Patented Aug. 27, 1918.

Application filed December 17, 1914. Serial No. 877,648.

*To all whom it may concern:*

Be it known that I, JOHN HARRIS, a citizen of the United States, residing at Cleveland, in the county of Cuyahoga and State of Ohio, have invented a certain new and useful Improvement in Welding-Torches, of which the following is a full, clear, and exact description, reference being had to the accompanying drawings.

This invention relates to burners or torches that are used for the purpose of what is known as "autogenous and heterogeneous welding," through the proper combustion of oxygen and another gas in such proportions as will produce a neutral flame. The general objects of the invention are to provide a burner or torch of this character which shall be extremely efficient and which at the same time shall be equally convenient of operation. One of the important advantages of my invention resides in the fact that the mixing of oxygen with the combustible gas (as hydrogen) is accomplished entirely within the burner or pipe itself and without the necessity for using a mixing box. A further object of the invention is to make each of these tips self contained whereby, when connected to the handle part of the device, each tip will have an oxygen injector which will be of a capacity proportional to the tip orifice and the pressure of the gases used.

Still further and more generally speaking the invention may be defined as consisting of the combinations of elements embodied in the claims hereto annexed and illustrated in the drawings forming part hereof wherein Figure 1 is a central longitudinal sectional view of a burner or torch constructed in accordance with my invention; Fig. 2 is a rear end elevation of the burner or torch shown in Fig. 1; while Figs 3 and 4 are sectional details corresponding respectively to the lines 3—3 of Fig. 1 and 4—4 of Fig. 2.

Describing by reference characters the various parts illustrated herein, A denotes one of the detachable tips for the pipe, B denotes the tubular handle and C a rear casting containing the valves which control the proportions of oxygen and combustible gas employed therewith to produce the welding flame. Each tip A comprises a combined burner and mixing tube 1 having its front end bent downwardly, as shown at 2. At its rear end, the tube 1 is fitted, as by threading, into a fitting 3, preferably a casting, having a bore 4 forming a continuation of the bore of the pipe 1 and a passageway 5 communicating at its forward end with the front portion of said bore. Within the bore 4 is located the injector nozzle 6, said nozzle having a conical tip 7 and a central bore 8, the conical tip 7 preferably extending partly across the forward end of the passageway 5, the injector being arranged to discharge into the tube 1. In the rear end of the tube 1 is a bushing 9 the bore whereof is proportional to the orifice at the tip of the pipe or burner as well as being proportional to the pressure of the gases used in such pipe or burner.

As previously stated, the fitting 3 contains the bore 4 and the passageway 5 preferably having their rear ends in substantially the same plane. The rear end of each branch is threaded and is provided with a conical seat 10 adapted to receive the complementarily shaped end 11 of the connection, said pipe connections being indicated at 12 and 13 respectively, and each being secured to its respective branch by means of a shouldered nut 14. The pipe connections 12 and 13 are shown as threaded into a valve casing 15 having ports 16 and 17 controlled by a plug 18 having the passages 19 and 20 therein adapted to register with the ports 16 and 17 respectively. The rear end of the valve casing is provided with a cylindrical seat 21 for the front end of the casing 22 constituting the handle proper, the rear end of the casing fitting a corresponding seat 23 on the rear casting C. 24 and 25 denote conduits located within the handle 22 and communicating at their ends respectively with the ports 16 and 17 of the valve casing and at their rear ends with passageways 26 and 27 in the rear casting C. These passageways leading to valve seats 28 and 29 respectively are controlled by valves substantially identical in construction with those described and claimed in my copending application No. 14,536, filed March 15, 1915. As these valves are identical in construction a detailed description of one will suffice for both and identical reference characters will be applied to the corresponding parts of the two valves. Each valve comprises generally a valve stem body 30 having a threaded portion 31 which is fitted into the internally threaded bosses 32, 33 respectively. Each valve body has its inner end reduced, as shown at 34, and provided with a spherical head 35 on which head there is mounted a valve point 36, which point is adapted to coöperate with its seat (28 or 29) and having its outer end hollow to enable it to receive therewithin the spherical head at the end of the valve stem, the wall surrounding the recess thus formed being spun or otherwise drawn inwardly so as to partly embrace the spherical head and at the same time to provide a sufficient amount of play or lost motion between the valve point and this head—the construction providing in effect a connection between the valve stem and the valve point. The advantages of this construction have been pointed out in connection with the copending application referred to hereinbefore and may not be elaborated upon herein. The rear end of the casting C is provided with a pair of connections 37, 38 leading respectively to the passageways 39 and 40 which are adapted to supply the gases admitted through said connections to the pipes 24 and 25 when the valves in the bosses 32 and 33 shall have been opened. The connections 37 and 38 are shaped and intended to receive flexible tubing for conducting oxygen and a combustible gas respectively thereto—the flexible tubing being omitted.

In operation, the valves 30 are adjusted to secure the proper amount and proper proportions between the oxygen and combustible gas and the valve 18 may then be conveniently opened by the hand of the operator which grasps the tubular handle 22. The flame burning from the orifice of the burner or blow pipe tip will be a neutral flame suitable for welding purposes, and the torch or burner illustrated herein is particularly well adapted for producing such a flame and in such condition as will enable the welding operation to be performed very quickly. When it is desired to vary the capacity of the torch or burner, this variation can be readily accomplished by unscrewing the nuts 14, removing the particular tip which may have been secured in place by such nuts and substituting for such tip another tip of the required capacity. This new tip will have an injector nozzle and a bushing 9 which will be adapted for the proper proportions between the oxygen and combustible gas as well as being proportional to the capacity of the burner or tip. In operation, the valves 30 will be adjusted to the capacity of the particular tip that may be in use.

The foregoing torch or burner, while extremely simple, is not only more efficient in operation, but is adaptable for all ordinary incidents of use wherein a large variety of separate burners or torches have been heretofore considered necessary; furthermore, I am enabled by my construction and arrangement of parts to secure high efficiency and all of the advantages that are present in welding torches heretofore in use without certain expensive and cumbersome attachments that have hitherto been considered absolutely necessary.

Having thus described my invention, what I claim is:—

1. In a device of the kind described, the combination, with a detachable burner tube, of a branched fitting to which said tube is attached, said fitting comprising a straight portion and a curved portion communicating with the straight portion, conduits connected to the branches of said fitting, a valve common to said conduits and independent valves arranged in the said conduits rearwardly of the first mentioned valve.

2. A device of the kind described comprising in combination a casting having independent valves arranged therein, conduits leading from said casting, a valve casing to which said conduits are connected, a valve in said casing common to both conduits, a branched fitting comprising a straight portion and a curved portion communicating with said straight portion, an injector arranged in said straight portion and a detachable burner pipe connected to said branched fitting in line with the straight portion thereof.

3. The combination, with a conduit for a combustion-supporting fluid and a conduit for a combustible fluid, of a fitting having a bore adapted to register with and form a continuation of the first-mentioned conduit and a curved passageway communicating at its front end with said bore and adapted to register at its rear end with the other conduit, an injector in said bore, means for connecting the said conduits to the rear end of the bore and to the rear end of the passageway, respectively, and a burner having a bushing in its rear end adapted to register with the injector and detachably connected to the front end of the fitting.

4. The combination, with a pair of conduits, of a fitting having a bore adapted to register with and form a continuation of one of said conduits and a branched passageway communicating at its front end with said bore and adapted to register at its rear end with the other of said conduits, an injector in said bore, means for connecting the said conduits to the rear end of the bore and the rear end of the passageway, respectively, and a burner adapted to register with the injector and detachably connected to the front end of the fitting.

5. The combination, with a conduit for a combustion-supporting fluid and a conduit for a combustible fluid, of a fitting having a bore adapted to register with and form a continuation of the first-mentioned conduit and a passageway communicating with said bore and extending laterally and rearwardly therefrom and adapted to register at its rear end with the other conduit, an injector threaded into said bore and having its discharge end at substantially the junction of the said bore and passageway; a burner connected to said fitting in front of the junction of the said passageway and bore, a bushing in the rear portion of said burner, and means for detachably connecting the rear end of said fitting with the aforesaid conduits.

6. The combination, with a pair of conduits, of a fitting having a bore adapted to register with and form a continuation of one of said conduits and a passageway communicating with said bore and extending laterally and rearwardly therefrom and adapted to register at its rear end with the other of said conduits, an injector in said bore and having its discharge end at substantially the junction of the said bore and passageway, a burner connected to said fitting in front of the junction of the said passageway and bore, and means for detachably connecting the said conduits to the rear of said fitting.

7. A tip comprising a branched fitting having a straight bore and a curved passageway extending rearwardly from the front portion of said bore, an injector in said bore and having its discharge end at the junction of the passageway with the bore, and a burner having a bushing at the rear end thereof adapted to register with said injector.

8. A tip comprising a branched fitting having a straight bore and a passageway extending angularly and rearwardly from said bore, an injector in said bore and having its discharge end at the junction of the passageway and bore, and a burner connected to the front end of said bore and having a bushing therein adapted to register with said injector.

9. A tip comprising a fitting having a straight bore and a branch extending laterally and rearwardly from said bore and having a passageway therethrough, an injector in the said bore with its front or discharge end substantially at the junction of said passageway and bore, and a burner connected to the front of said fitting beyond the junction of the passageway and bore and having a bushing adapted to register with said injector.

In testimony whereof, I hereunto affix my signature in the presence of two witnesses.

JOHN HARRIS.

Witnesses:
BRENNAN B. WEST,
HUGH B. MCGILL.